United States Patent
Ichiyama

(10) Patent No.: US 11,326,709 B2
(45) Date of Patent: May 10, 2022

(54) DIAPHRAGM TYPE OF SOLENOID VALVE

(71) Applicant: SHINWA CONTROLS CO., LTD, Kawasaki (JP)

(72) Inventor: Ryoji Ichiyama, Kawasaki (JP)

(73) Assignee: Shinwa Controls Co., Ltd, Kawasaki (JP)

( * ) Notice: Subject to any disclaimer, the term of this patent is extended or adjusted under 35 U.S.C. 154(b) by 0 days.

(21) Appl. No.: 17/289,400

(22) PCT Filed: Nov. 5, 2019

(86) PCT No.: PCT/JP2019/043323
§ 371 (c)(1),
(2) Date: Apr. 28, 2021

(87) PCT Pub. No.: WO2020/095908
PCT Pub. Date: May 14, 2020

(65) Prior Publication Data
US 2021/0396328 A1  Dec. 23, 2021

(30) Foreign Application Priority Data

Nov. 6, 2018  (JP) .............................. JP2018-208852

(51) Int. Cl.
*F16K 31/06* (2006.01)
*F16K 7/14* (2006.01)

(52) U.S. Cl.
CPC ............ *F16K 31/0672* (2013.01); *F16K 7/14* (2013.01); *F16K 31/0675* (2013.01)

(58) Field of Classification Search
CPC ..... F16K 31/0672; F16K 7/14; F16K 31/0675
See application file for complete search history.

(56) References Cited

U.S. PATENT DOCUMENTS 5,333,643 A * 8/1994 Gilchrist ............. F16K 31/0658
137/605
2007/0241298 A1* 10/2007 Herbert ..................... F16K 7/16
251/129.04

FOREIGN PATENT DOCUMENTS

JP  2009-257438 A1  11/2009
JP  2013-091274 A1  5/2013

OTHER PUBLICATIONS

International Search Report and Written Opinion (Application No. PCT/JP2019/043323) dated Jan. 7, 2020.

* cited by examiner

*Primary Examiner* — Umashankar Venkatesan
(74) *Attorney, Agent, or Firm* — Burr & Brown, PLLC

(57) ABSTRACT

The present invention prevents that a diaphragm boss drops off from a diaphragm when a movable core is moved up. The present invention is a diaphragm type of solenoid valve including: a main body (10) having a diaphragm seating surface (12) in which a flow channel is opened; a diaphragm (23) configured to be seated on the diaphragm seating surface (12) of the main body (10); a diaphragm boss (22) holding the diaphragm (23); a movable core (21) holding the diaphragm boss (22); and a coil containing body (40) configured to apply an electromagnetic force to the movable core (21) in order to move the movable core in a direction away from the diaphragm seating surface (12) of the main body such that the diaphragm (23) is released from the diaphragm seating surface (12); wherein the diaphragm (23) is integrally formed with the diaphragm boss (22) by a baking process.

6 Claims, 6 Drawing Sheets

PRIOR ART

DIAPHRAGM TYPE OF SOLENOID VALVE

TECHNICAL FIELD

The present invention relates to a diaphragm type of solenoid valve which is used for controlling a flow or a stop of a fluid that is easy to solidify when dried, such as an ink for printing.

BACKGROUND ART

Conventionally, a diaphragm type of solenoid valve has been used for controlling a flow or a stop of a fluid.

For example, as shown in FIG. 4, a conventional diaphragm type of solenoid valve includes: a main body 110 having a diaphragm seating surface 112 in which flow channels 110a, 110b are opened; a diaphragm 123 configured to be seated on the diaphragm seating surface 112 of the main body 110; a diaphragm boss 122 holding the diaphragm 123; a movable core (not shown in FIG. 4) holding the diaphragm boss 122; and a coil containing body (not shown in FIG. 4) configured to apply an electromagnetic force to the movable core in order to move the movable core in a direction away from the diaphragm seating surface 112 of the main body 110 such that the diaphragm 123 is released from the diaphragm seating surface 112.

In detail, the diaphragm boss 122 includes a to-be-covered main part 122m which has a large diameter and is covered by the diaphragm 123, and a small-diameter part 122e which extends upward from a center portion of the to-be-covered main part 122m. The diaphragm 123 includes: a diaphragm-boss covering part 123c which covers the to-be-covered main part 122m and a lower area of the small-diameter part 122e; a thinner part 123b which annularly extends on an outer side than the diaphragm-boss covering part 123c; and a thicker outer peripheral part 123a which annularly extends on a further outer side than the thinner part 123b.

The to-be-covered main part 122m and the lower area of the small-diameter part 122e of the diaphragm boss 122 are fitted into (and removable from) the diaphragm-boss covering part 123c of the diaphragm 123, with an aid of an elastic deformation of the diaphragm-boss covering part 123c, by a manual operation of an operator.

The other basic structure of the conventional diaphragm type of solenoid valve has been disclosed in JP-A-2009-257438 (Patent Document 1), for example.

PRIOR ART DOCUMENT

Patent Document

Patent Document 1 is JP-A-2009-257438.

SUMMARY OF INVENTION

Technical Problem

As described above, in the conventional diaphragm type of solenoid valve as shown in FIG. 4, the to-be-covered main part 122m and the lower area of the small-diameter part 122e of the diaphragm boss 122 are fitted into (and removable from) the diaphragm-boss covering part 123c of the diaphragm 123, with an aid of an elastic deformation of the diaphragm-boss covering part 123c, by a manual operation of an operator. In other words, a fitting force between the to-be-covered main part 122m and the lower area of the small-diameter part 122e of the diaphragm boss 122 and the diaphragm-boss covering part 123c of the diaphragm 123 is so small that a manual operation of an operator can remove them from each other.

Thus, in a case wherein the conventional diaphragm type of solenoid valve shown in FIG. 4 is used for controlling a flow or a stop of a fluid that is easy to solidify when dried, such as an ink for printing, the fluid may solidify between the diaphragm 123 and the diaphragm seating surface 112 of the main body 110 (for example, an end surface of a partition wall 110w partitioning the flow channels 110a, 110b), and when the movable core is moved up, the to-be-covered main part 122m of the diaphragm boss 122 may drop off from the diaphragm-boss covering part 123c of the diaphragm 123.

The present invention has been made based on the above findings. The object of the present invention is to provide a diaphragm type of solenoid valve in which a diaphragm boss does not drop off from a diaphragm when a movable core is moved up.

Solution to Problem

The present invention is a diaphragm type of solenoid valve including: a main body having a diaphragm seating surface in which a flow channel is opened; a diaphragm configured to be seated on the diaphragm seating surface of the main body; a diaphragm boss holding the diaphragm; a movable core holding the diaphragm boss; and, a coil containing body configured to apply an electromagnetic force to the movable core in order to move the movable core in a direction away from the diaphragm seating surface of the main body such that the diaphragm is released from the diaphragm seating surface; wherein the diaphragm is integrally formed with the diaphragm boss by a baking process.

According to the above feature, since the diaphragm is integrally formed with the diaphragm boss by a baking process, it is prevented that the diaphragm boss drops off from the diaphragm when the movable core is moved up.

Preferably, the coil containing body has a cylindrical part surrounding the movable core, the main body has an outside cylindrical part configured to connect with the cylindrical part of the coil containing body on an outer side than the diaphragm seating surface, an inner diameter of the cylindrical part of the coil containing body is smaller than an inner diameter of the outside cylindrical part of the main body, and a diaphragm ring is interposed between an outer periphery of the diaphragm and the coil containing body.

In this case, by means of the diaphragm ring, the outer periphery of the diaphragm can be held with a suitable fastening force. (When the cylindrical part of the coil containing body is directly pressed onto the outer periphery of the diaphragm, variation in the fastening force may be easily caused, which is troublesome.)

In addition, in this case, if an inner diameter of the diaphragm ring is smaller than an inner diameter of the movable core, when the diaphragm boss and the movable core are attached with each other in a detachable manner, the diaphragm ring can be disposed on the diaphragm in a state wherein the diaphragm boss and the movable core are detached from each other, which is good in operability.

For example, it is preferable that the diaphragm boss and the movable core are threadedly engaged with each other in a detachable manner. However, the diaphragm boss and the movable core may be attached with each other in another type of detachable manner, such as a fitting-in.

In addition, it is preferable that the diaphragm boss includes: a to-be-covered main part which has a large diameter and is covered by the diaphragm; a to-be-covered tapered part which extends upward from the to-be-covered main part in a tapered manner and is covered by the diaphragm; and a to-be-covered small-diameter part which extends further upward from the to-be-covered tapered part and is covered by the diaphragm.

When the above feature is adopted, a rubber material, which is a material for the diaphragm, easily and smoothly spreads around the to-be-covered main part, the to-be-covered tapered part and the to-be-covered small-diameter part. Thus, occurrence of molding defects can be suppressed. In addition, when the diaphragm boss is moved up (the diaphragm valve is opened), concentration of load applied to the diaphragm is also suppressed, so that deterioration of the diaphragm is suppressed, and a risk of occurrence of cracking is also significantly reduced.

Advantageous Effects of Invention

According to the present invention, since the diaphragm is integrally formed with the diaphragm boss by a baking process, it is prevented that the diaphragm boss drops off from the diaphragm when the movable core is moved up.

DESCRIPTION OF EMBODIMENTS

An embodiment of the present invention will be described below with reference to the attached drawings.

Figure 1:
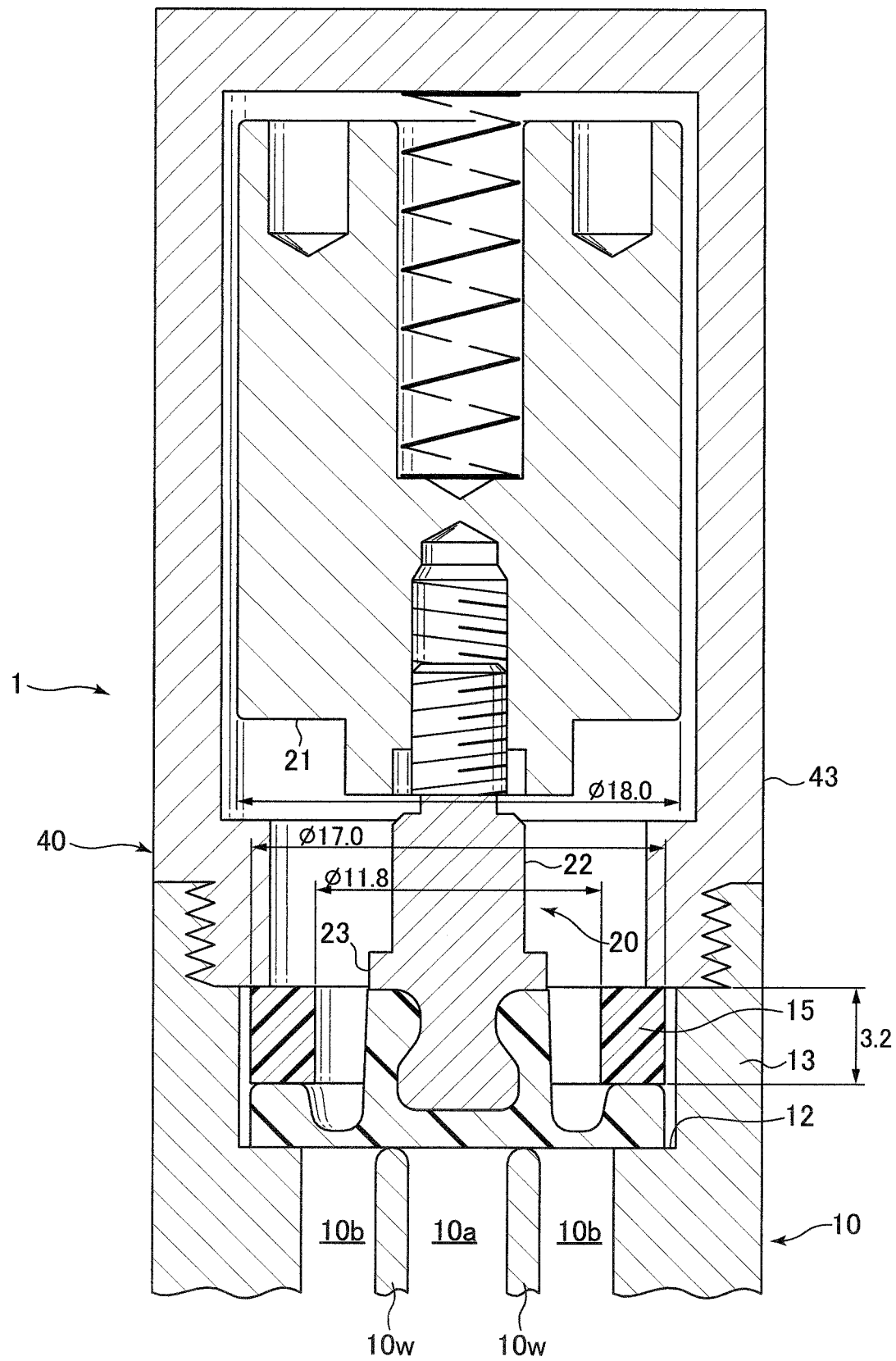
FIG. 1 is a schematic sectional view of a diaphragm type of solenoid valve according to an embodiment of the present invention.
Figure 2:
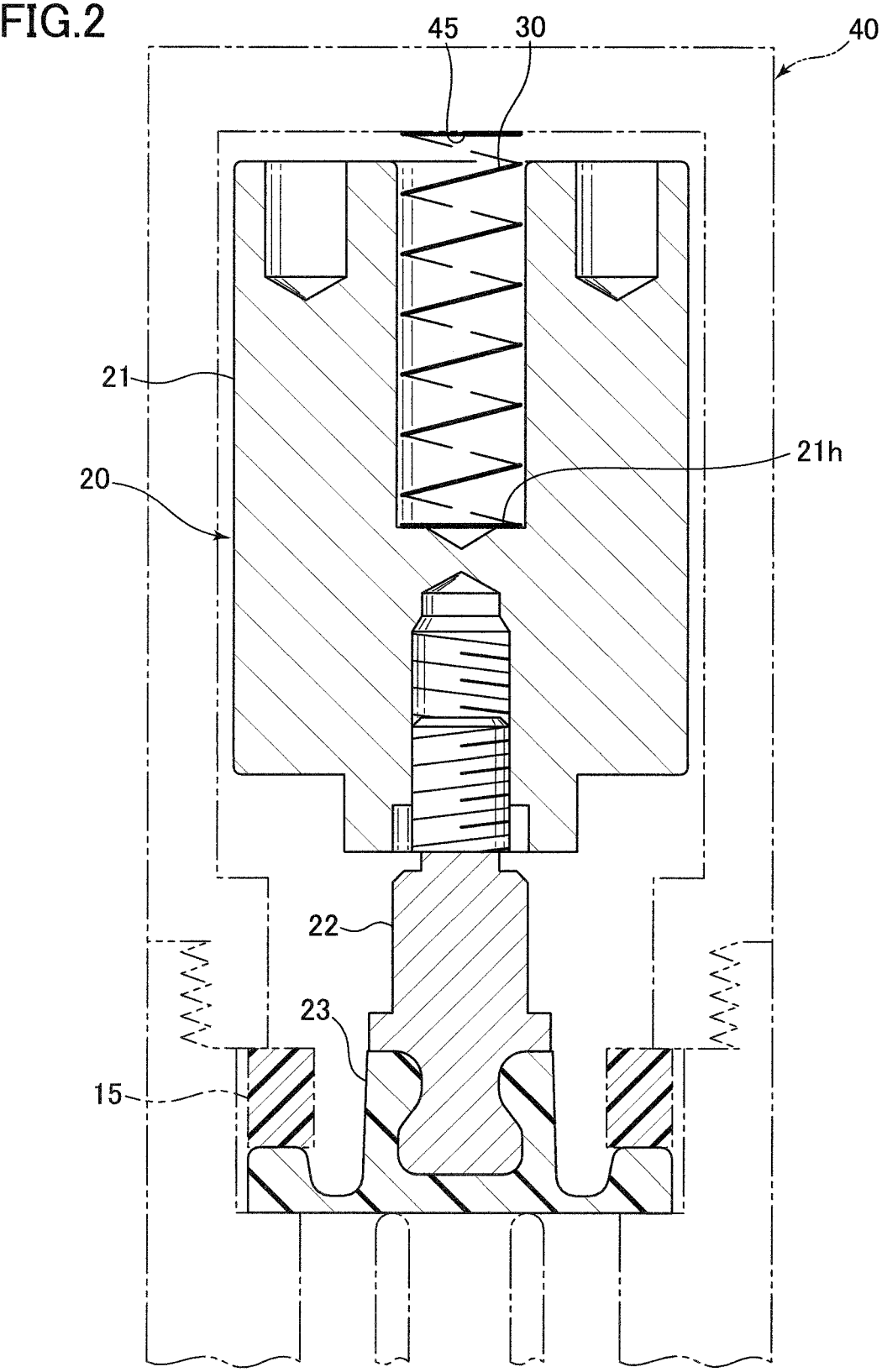
FIG. 2 is a schematic sectional view of a movable part of the diaphragm type of solenoid valve shown in FIG. 1.
Figure 3A:
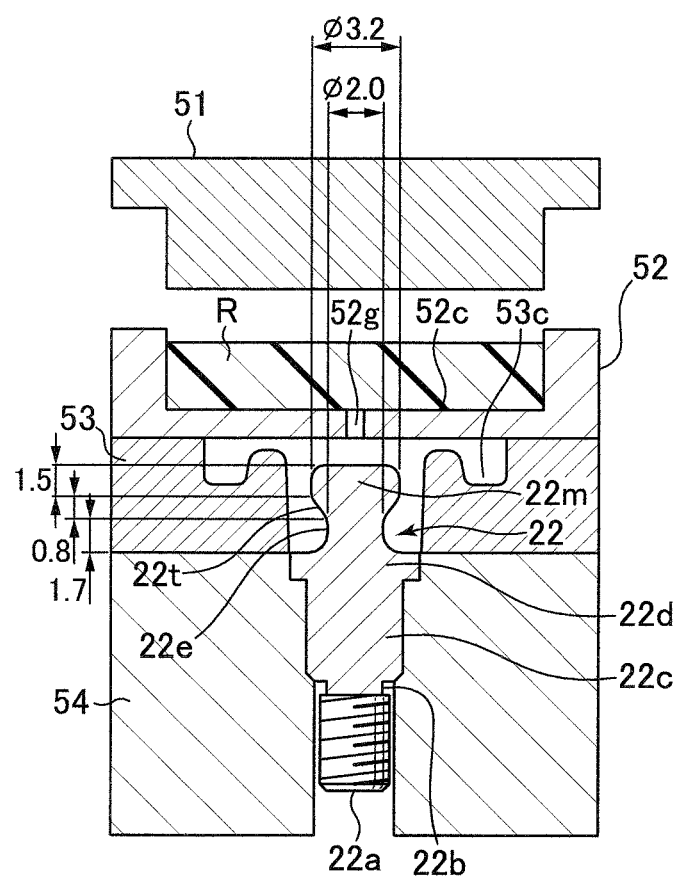
FIG. 3A is a schematic sectional view for explaining a baking process of the diaphragm onto the diaphragm boss shown in FIGS. 1 and 2.
Figure 3B:
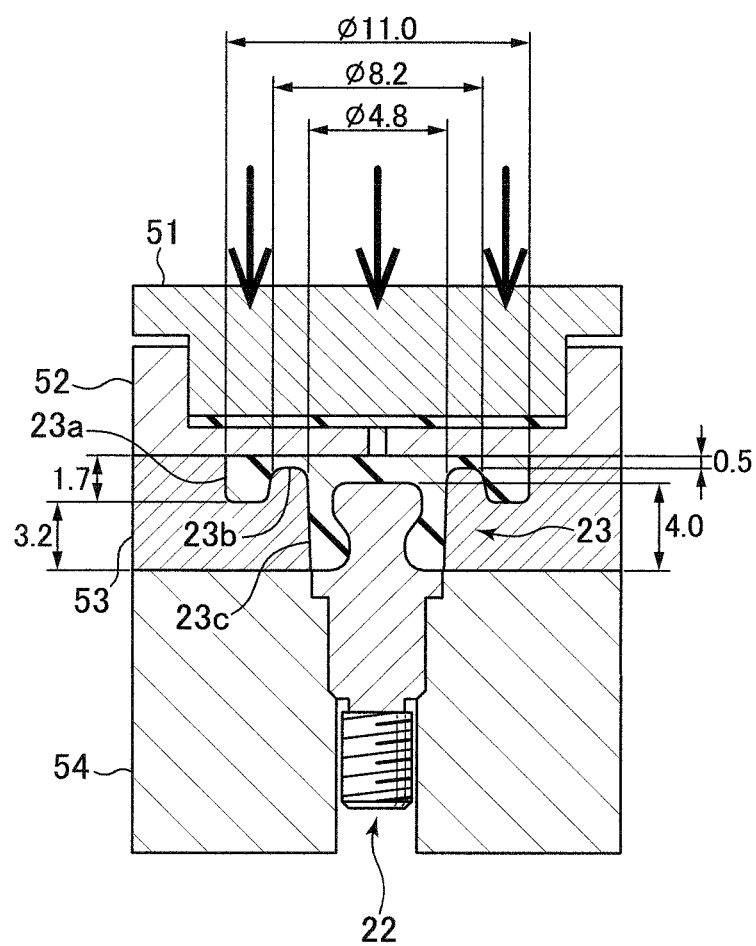
FIG. 3B is a schematic sectional view for explaining a baking process of the diaphragm onto the diaphragm boss shown in FIGS. 1 and 2.
Figure 3C:
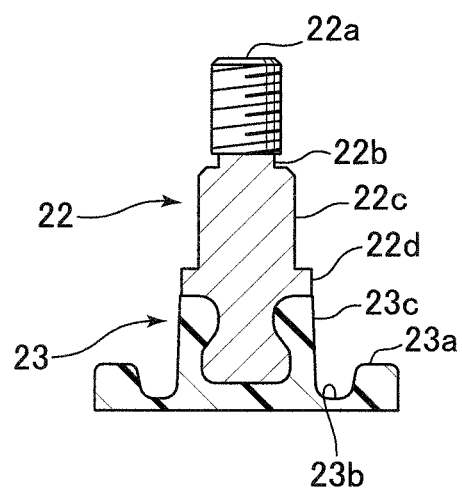
FIG. 3C is a schematic sectional view for explaining a baking process of the diaphragm onto the diaphragm boss shown in FIGS. 1 and 2.
Figure 4:
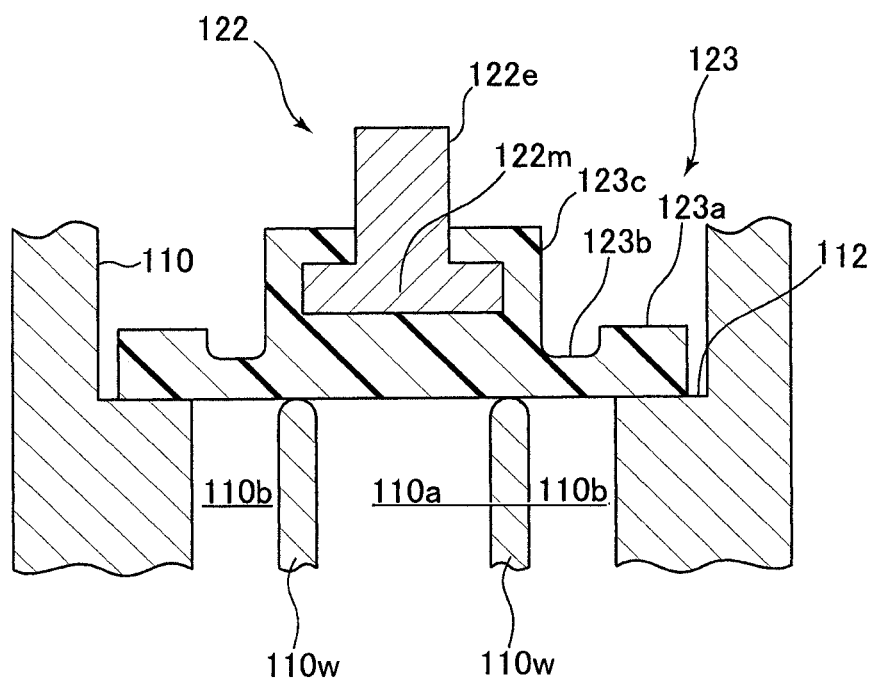
FIG. 4 is a schematic sectional view of a conventional diaphragm type of solenoid valve.

FIG. 1 is a schematic sectional view of a diaphragm type of solenoid valve 1 according to an embodiment of the present invention. FIG. 2 is a schematic sectional view of a movable part 20 of the diaphragm type of solenoid valve 1 shown in FIG. 1. FIG. 3A to 3C are schematic sectional views for showing a baking process of the diaphragm 23 onto the diaphragm boss 22 shown in FIGS. 1 and 2.

As shown in FIGS. 1 to 3C, the diaphragm type of solenoid valve 1 according to the present embodiment includes: a main body 10 having a diaphragm seating surface 12 in which flow channels 10a, 10b are opened; a diaphragm 23 configured to be seated on the diaphragm seating surface 12 of the main body 10; a diaphragm boss 22 holding the diaphragm 23; a movable core 21 holding the diaphragm boss 22; and a coil containing body 40 configured to apply an electromagnetic force to the movable core 21 in order to move the movable core 21 in a direction away from the diaphragm seating surface 12 of the main body 10 such that the diaphragm 23 is released from the diaphragm seating surface 12. A feature of the diaphragm type of solenoid valve 1 according to the present embodiment is that the diaphragm 23 is integrally formed with the diaphragm boss 22 by a baking process.

In more detail, particularly with reference to FIGS. 3A to 3C, the diaphragm boss 22 includes: a to-be-covered main part 22m (whose height is 1.5 mm and whose diameter is 3.2 mm, for example) which has a large diameter and is covered by the diaphragm 23; a to-be-covered tapered part 22t (whose height is 0.8 mm, for example) which extends upward (downward in FIGS. 3A and 3B) from the to-be-covered main part 22m in a tapered manner and is covered by the diaphragm 23; and a to-be-covered small-diameter part 22e (whose height is 1.7 mm and whose diameter is 2.0 mm, for example) which extends further upward (downward in FIGS. 3A and 3B) from the to-be-covered tapered part 22t and is covered by the diaphragm 23. As shown in the drawings, the respective parts are smoothly continuous (with R (curved) portions).

In addition, the uppermost portion (the lowermost portion in FIGS. 3A and 3B) of the diaphragm boss 22 is provided with a male threaded part 22a, which is configured to threadedly engage with the movable core 2. A small-diameter part 22b, a middle-diameter part 22c and a large-diameter part 22d are provided in this order between the male threaded part 22a and the to-be-covered small-diameter part 22e.

On the other hand, the diaphragm 23 includes: a diaphragm-boss covering part 23c (whose height is 4.9 mm and whose diameter is 4.8 mm, for example) which covers the to-be-covered main part 22m, the to-be-covered tapered part 22t and the to-be-covered small-diameter part 22e; a thinner part 23b (whose height is 0.5 mm and whose diameter is 8.2 mm, for example) which annularly extends on an outer side than the diaphragm-boss covering part 23c; and a thicker outer peripheral part 23a (whose height is 1.7 mm and whose diameter is 11.0 mm, for example) which annularly extends on a further outer side than the thinner part 23b. As shown in the drawings, the respective parts are smoothly continuous (with R (curved) portions).

Returning to FIG. 1, the coil containing body 40 has a cylindrical part 43 surrounding the movable core 21. The main body 10 has an outside cylindrical part 13 configured to connect (for example, threadedly engage) with the cylindrical part 54 of the coil containing body 40 on an outer side than the diaphragm seating surface 12.

An inner diameter of the cylindrical part 43 of the coil containing body 40 is smaller than an inner diameter of the outside cylindrical part 13 of the main body 10. A diaphragm ring 15 (whose height is 3.2 mm, whose inner diameter is 11.8 mm and whose outer diameter is 17.0 mm, for example), which is made of a resin, is interposed between the thicker outer peripheral part 23a of the diaphragm and the coil containing body 40.

Because of the elasticity of the diaphragm ring 15, the thicker outer peripheral part 23a of the diaphragm 23 can be held with a suitable fastening force between the coil containing body 40 and the diaphragm seating surface 12 of the main body 10. If the cylindrical part 43 of the coil containing body 40 is directly pressed onto the thicker outer peripheral part 23a of the diaphragm 23 without using the diaphragm ring 15, variation in the fastening force may be easily caused, which is troublesome.

Herein, as shown in FIG. 1, in the present embodiment, an inner diameter of the diaphragm ring 15 is smaller than an inner diameter of the movable core 21 (which is 18.0 mm, for example). Thus, if the diaphragm boss 22 and the movable core 21 are not detachable from each other (like the conventional structure), it is necessary to cause the diaphragm ring 15 to pass over the diaphragm 23 while deforming the diaphragm 23. This may cause disadvantage effects in sealing properties of the diaphragm 23.

However, according to the present embodiment, the male threaded part 22a of the diaphragm boss 22 is threadedly engaged with the movable core 21 in a detachable manner. Thus, when the diaphragm ring 15 is set at a desired position, the movable core 21 can be removed from the diaphragm boss 22 by releasing the threadedly engagement. This provides good operability and causes no disadvantage effects in the sealing properties of the diaphragm 23.

It is preferable that Loctite (trademark) is applied on the male threaded part 22a of the diaphragm boss 22 and/or a corresponding female threaded part of the movable core 21 in order to prevent loosening of the threadedly engagement. In addition, it is preferable that a torque management is performed by means of a dedicated tool (for example, a length from the lower surface of the movable core 21 to the lower surface of the diaphragm 23 may be managed) after a fastening operation for the threadedly engagement.

For example, a baking process of the diaphragm 23 onto the diaphragm boss 22 may be performed by a baking device as shown in FIGS. 3A to 3C.

As shown in FIG. 3A, the diaphragm boss 22 is held by the diaphragm boss holding part 54 in an orientation wherein the male threaded part 22a faces downward. For example, a step between the small-diameter part 22b and the middle-diameter part 22c and/or a step between the middle-diameter part 22c and the large-diameter part 22d may be used for the holding.

A mold 53 is arranged adjacently to an upper surface side of the diaphragm boss holding part 54. The mold 53 is provided with a cavity 53c so as to contain the to-be-covered main part 22m, the to-be-covered tapered part 22t and the to-be-covered small-diameter part 22e of the diaphragm boss 22. A gap between the cavity 53c (an inside volume thereof) and the to-be-covered main part 22m, the to-be-covered tapered part 22t and the to-be-covered small-diameter part 22e of the diaphragm boss 22 corresponds to the diaphragm 23.

A rubber supplying unit 52 is arranged adjacently to an upper surface side of the mold 53. The rubber supplying unit 52 is provided with a rubber containing part 52c configured to contain a rubber material R (which has been usually vulcanized) in a heated and softened state (fluid state), and a gate 52g configured to communicate the rubber containing part 52c with the cavity 53c of the mold 53.

A press machine 51 is arranged on an upper surface side of the rubber containing part 52c of the rubber supplying unit 52. As shown in FIG. 3B, when the press machine 51 is moved down, the rubber material R that has been contained in the rubber containing part 52c is pushed (pressurized) into the cavity 53c of the mold 53 through the gate 52g, so that the cavity 53c is filled with the rubber material R. The pressurized state by the press machine 51 is maintained for a predetermined time, so that the rubber material R is hardened in a state wherein the rubber material R covers the to-be-covered main part 22m, the to-be-covered tapered part 22t and the to-be-covered small-diameter part 22e of the diaphragm boss 22. Thereby, the diaphragm 23 is molded (the molding of the diaphragm 23 and the integration (bonding) thereof onto the diaphragm boss 22 are achieved at the same time).

Herein, since the to-be-covered tapered part 22t is provided between the to-be-covered main part 22m and the to-be-covered small-diameter part 22e of the diaphragm boss 22, the rubber material R can be smoothly filled in the cavity 53c. In addition, when the diaphragm boss 22 is moved up (the diaphragm valve is opened), concentration of load applied to the diaphragm 23 can be also suppressed. Thereby, deterioration of the diaphragm 23 is suppressed, and a risk of occurrence of cracking is also significantly reduced. In order to obtain these effects, it is preferable that an inclination angle of the to-be-covered tapered part 22t is within 30 to 60 degrees.

After the rubber material R has been hardened (cured), the press machine 51 and the rubber supplying unit 52 are separated from the mold 53, and the diaphragm 22, onto which the diaphragm 23 has been integrally formed by the baking process, is removed from the mold 53 and the diaphragm boss holding part 54. Thereafter, a deburring operation is performed for a portion corresponding to the gate 52g, so that a state as shown in FIG. 3C is obtained.

Subsequently, the diaphragm ring 15 made of the resin is arranged on the diaphragm 23, and the male threaded part 22a of the diaphragm boss 22 is threadedly engaged with the corresponding female threaded part of the movable core 21. Then, assembling of the movable part 20 is completed. This state corresponds to the state as shown in FIG. 2.

Subsequently, the movable part 20 is placed on the diaphragm seating surface 12 of the main body 10, and the coil containing body 40 is arranged to surround the movable core 21. Then, assembling of the diaphragm type of solenoid valve 1 is completed. This state corresponds to the state as shown in FIG. 1.

For example, when the cylindrical part 43 of the coil containing body 40 is threadedly engaged with the outside cylindrical part 13 of the main body 10, the thicker outer peripheral part 23a of the diaphragm 23 is held with a suitable fastening force between an inner-diameter area of the cylindrical part 43 of the coil containing body 40 and the diaphragm seating surface 12 via the diaphragm ring 15.

As shown in FIG. 2, a spring containing hole 21h is provided on an upper end side of the movable core 21, and a coil spring 30 is contained in the spring containing hole 21h. The coil spring 30 is compressed between an upper inside surface 45 of the coil containing body 40 and a bottom surface of the spring containing hole 21h, so that the movable core 21 is biased downward with respect to the coil containing body 40. Thereby, the diaphragm 23 is seated on the diaphragm seating surface 12 when no electromagnetic force is applied by the coil containing body 40.

EXPLANATION OF SIGN 1 diaphragm type of solenoid valve
10 main body
10a first flow channel
10b second flow channel
10w partition wall
12 diaphragm seating surface
13 outside cylindrical part
15 diaphragm ring
20 movable part
21 movable core
21h spring containing hole
22 diaphragm boss
22a male threaded part
22b small-diameter part
22c middle-diameter part
22d large-diameter part
22e to-be-covered small-diameter part
22t to-be-covered tapered part 22*m* to-be-covered main part
23 diaphragm
23*a* thicker outer peripheral part
23*b* thinner part
23*c* diaphragm-boss covering part
30 coil spring
40 coil containing body
43 cylindrical part
45 upper inside surface
51 press machine
52 rubber supplying unit
52*c* rubber containing part
52*g* gate
53 mold
53*c* cavity
54 diaphragm boss holding part
110 main body
110*a* first flow channel
110*b* second flow channel
1110*w* partition wall
112 diaphragm seating surface
122 diaphragm boss
122*e* small-diameter part
122*m* to-be-covered main part
123 diaphragm
123*a* thicker outer peripheral part
123*b* thinner part
123*c* diaphragm-boss covering part

What is claimed is:

1. A diaphragm type of solenoid valve comprising:
a main body having a diaphragm seating surface in which a flow channel is opened;
a diaphragm configured to be seated on the diaphragm seating surface of the main body;
a diaphragm boss handling the diaphragm;
a moveable core holding the diaphragm boss; and
a coil containing body configured to apply an electromagnetic force to the moveable core in order to move the moveable core in a direction away from the diaphragm seating surface of the main body such that the diaphragm is released from the diaphragm seating surface;
wherein
the diaphragm is integrally formed with the diaphragm boss by a baking process,
the coil containing body has a cylindrical part surrounding the movable core,
the main body has an outside cylindrical part configured to connect with the cylindrical part of the coil containing body on an outer side than the diaphragm seating surface, and
a diaphragm ring is interposed between an outer periphery of the diaphragm and the coil containing body.

2. The diaphragm type of solenoid valve according to claim 1, wherein
an inner diameter of the diaphragm ring is smaller than an inner diameter of the movable core, and
the diaphragm boss and the movable core are attached with each other in a detachable manner.

3. The diaphragm type of solenoid valve according to claim 2, wherein
the diaphragm boss and the movable core are threadedly engaged with each other in a detachable manner.

4. The diaphragm type of solenoid valve according to claim 3, wherein
the diaphragm boss includes:
a to-be-covered main part which has a large diameter and is covered by the diaphragm;
a to-be-covered tapered part which extends upward from the to-be-covered main part in a tapered manner and is covered by the diaphragm; and
a to-be-covered small-diameter part which extends further upward from the to-be-covered tapered part and is covered by the diaphragm.

5. The diaphragm type of solenoid valve according to claim 2, wherein
the diaphragm boss includes:
a to-be-covered main part which has a large diameter and is covered by the diaphragm;
a to-be-covered tapered part which extends upward from the to-be-covered main part in a tapered manner and is covered by the diaphragm; and
a to-be-covered small-diameter part which extends further upward from the to-be-covered tapered part and is covered by the diaphragm.

6. The diaphragm type of solenoid valve according to claim 1, wherein
the diaphragm boss includes:
a to-be-covered main part which has a large diameter and is covered by the diaphragm;
a to-be-covered tapered part which extends upward from the to-be-covered main part in a tapered manner and is covered by the diaphragm; and
a to-be-covered small-diameter part which extends further upward from the to-be-covered tapered part and is covered by the diaphragm.

* * * * *